PROCESS FOR PREPARING LOW MOLECULAR WEIGHT AMYLOSES

Filed March 25, 1969

W: Waxy-corn Starch
P: Potato Starch
SE: Pseudomonas Enzyme
AE: Aerobacter Enzyme
Sol: Soluble Portion
Pptd: Precipitated Portion

United States Patent Office 3,730,840
Patented May 1, 1973

3,730,840
PROCESS FOR PREPARING LOW MOLECULAR WEIGHT AMYLOSES
Kaname Sugimoto, Mamoru Hirao, and Mikihiko Yoshida, Okayama, Makoto Shiosaka, Fukuoka-shi, and Yasuyuki Yokobayashi, Sakai-shi, Osaka, Japan, assignors to Hayashibara Company, Okayama-shi, Okayama, Japan
Filed Mar. 25, 1969, Ser. No. 810,314
Claims priority, application Japan, Apr. 1, 1968, 43/21,365
Int. Cl. C13l 1/00
U.S. Cl. 195—31 R    4 Claims

ABSTRACT OF THE DISCLOSURE

A process for the preparation of straight-chain amyloses having molecular chain lengths of 20 to 30 that have never been obtainable hitherto.

Figure 1:
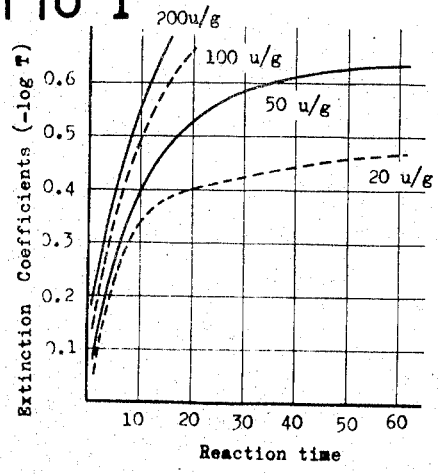

Straight-chain low molecular weight amyloses wherein the molecules have relatively uniform chain length are obtained by liquefying a starch slurry to a relatively low extent, rapidly cooling the liquefied slurry before there occurs a substantial retrogradation and selectively decomposing and cutting the α-1,6-glucoside bonds of amylopectin contained in the starch.

---

This invention relates to a process for preparing amyloses of relatively low molecular weights having straight-chain structures by selectively decomposing only the branching bonds of amylopectin, the high molecular weight polymer of dextrose that is bonded like branches of trees, with α-1,6-glucosidase.

As is known, starch is a mixture of straight-chain molecules consisting entirely of α-1,4 bonds of dextrose and which are called amylose and a large proportion of branched molecules called amylopectin which consist essentially of α-1,4 bonds and branched with α-1,4 bonds and α-1,6 bonds. Both of the constituents are high molecular substances, the former being reported to have a polymerization degree of over 1000 and the latter having an even higher degree of over 2000. Amylose is apt to retrograde and precipitate, while amylopectin has a high degree of viscosity in aqueous solution and is likely to swell. Since starch is a mixture of molecules with such different structures and different molecular weights, its behaviors are diversified and take no definite pattern.

This has practically limited the applications of various starches to pasting or sizing use. In perfecting the present invention, therefore, it was noted that if starch was suitably decomposed, particularly by cutting off the branches at the joints and thus trimming the irregularly branched structure, it could be converted into straight-chain amylose of regular molecular weight which would then be able to enjoy remarkably extended demands like ethylene, propylene and other petroleum products formed by cracking. With this in mind, the present inventors specifically looked for enzymes which could selectively decompose the α-1,6-bonds, the branching bonds of amylopectin. As a result, it was found that, in addition to such well-known enzymes as isoamylases from yeasts, R-enzymes af plant origins, and those from bacteria (Pullulanases) of the genus Aerobacter, the recently discovered enzymes such as those produced by the bacteria of the genus Psudomonas as disclosed in Pat. 3,560,345 and the enzymes yielded by the genera Agrobacterium, Azotobacter, Lactobacillus, Leuconostoc, Microbacterium, Nocardia, Pediococcus, Sarcina, Serratia, Staphylococcus, Streptococcus, Bacillus, Micrococcus, Erwinia, etc. can all decompose the α-1,6-glucoside bonds of starches. However, little is known of the mechanisms and conditions for their activities, and these enzymes appear to have some specificity. Since the bacterial pullulanase and the Pseudomonas enzymes exhibit particularly high activities, the decomposition of various starches by these enzymes was studied. The study has led to the discovery of a new process for preparing "low molecular weight amyloses of regular chain lengths" which have never been produced before.

Figure 2:
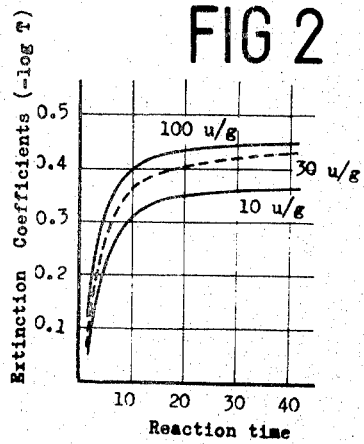
Figure 3:
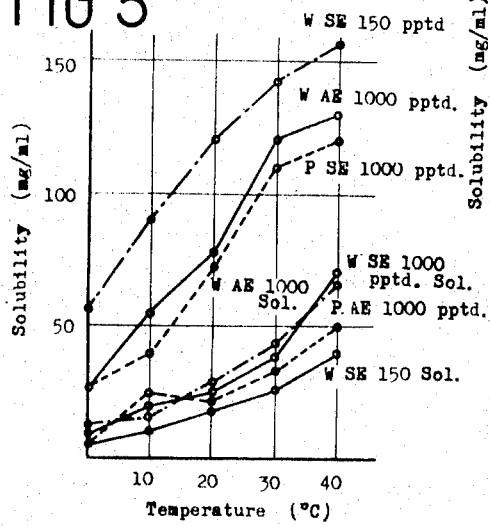
Figure 4:
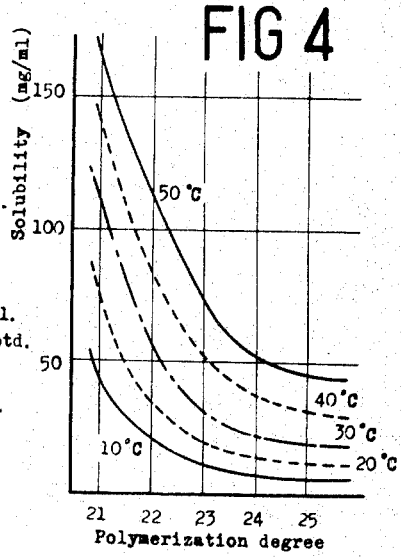
Figure 5:
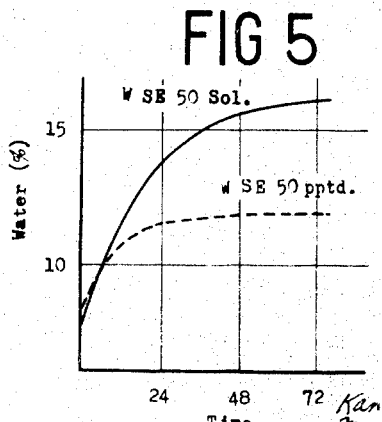

This invention will be hereinafter described in detail with reference to the accompanying drawings; in which, FIGS. 1 and 2 are graphs of extinction coefficients determined with the color reaction of amylose as a measure of progress of the reaction in accordance with the present invention; FIGS. 3 and 4 are graphs showing the solubility of the products; and FIG. 5 is a graph showing the moisture absorption of the products.

For the convenience of explanation, the process will be described below as applied to waxy corn starch, a variety of starch with a simplified composition. Because this starch consists solely of amylopectin having branched structure, its decomposition product should also be simple in structure. A 5 to 10 aqueous suspension of waxy corn starch is gradually heated with stirring. After the suspension has been gelatinized, it is heated in a pressure oven at a pressure of 1.5 to 2 atm. for 30 minutes to effect complete gelatinization and dispersion. The resultant is cooled, adjusted to pH 4.5 and α-1,6-glucosidase obtained from the bacteria of the genus Pseudomonas is added at a rate of 20 to 50 units per gram of the starch. At regular intervals of time the mixture is sampled, and the degree of the reaction is determined by utilizing the color reaction of the amylose. The blueness with the addition of a predetermined amount of an iodine-potassium iodide solution is evaluated in terms of the extinction coefficient at 570 m$\mu$. The result of such a test is as given in FIG. 1. When the enzyme is used in an amount of 50–100 $\mu$/g. starch, the decomposition proceeds almost to the limit in 50–20 hours. Where an aerobacter enzyme is employed, the pH is adjusted to 6 as shown in FIG. 2. When a pseudomonas enzyme is obtained, the amylose of straight-chain molecules produced with the progress of the reaction forms mycels because of the crystallinity and precipitates. Upon completion of the reaction, therefore, it can be readily separated from water by centrifuge. The yield can range from 80 to 90% of the starting material. The product when washed several times each with a small amount of water and then dried will take the form of white powder. When the polymerization degree is determined at the reducing end groups by the periodic-acid oxidation method, the precipitated part indicates a polymerization degree of 23 to 24. This agrees well with the accepted values of 20 to 30 of the branched chain parts of amylopectin. In the experiment, for caution's sake, the presence or absence of branches on the structure was examine by the Smith decomposition method. There were found about two branches and, though it appeared that some very short branches remain unremoved, the product had relatively low solubility to water, formed mycels and precipitated. X-ray diffraction clearly indicated crystallizability, demonstrating that the product is a straight-chain amylose of relatively short chains.

The portion dissolved in the reaction solution affords, on concentration, white crystalline powder at a yield of not more than 20% of the starting material. While this portion is more soluble than the precipitated portion, the polymerization degree and the number of branches are 17 and 1–2, respectively, and this portion is slightly lower in molecular weight but apparently has less branches than the precipitated portion. X-ray diffraction shows partial crystallinity, and therefore this product is a soluble amylose.

As described above, the process of the invention makes it possible to obtain straight-chain amyloses having polymerization degrees of 20 to 30 that have never been introduced before. The conventional processes for decomposing starch with an acid or α-amylase involve random decomposition, and therefore the products are mixtures of molecules of many different sizes ranging in the polymerization degree from 1 to several tens or even several hundreds and, in the aspect of molecular structure, they are mixtures of straight-chain and branched molecules. In contrast to these, the products according to the present invention have uniform molecules of generally regular chain lengths and straight-chain molecular structure. The products are crystallizable, suitably soluble in water, by far less viscous than starch, and less viscous than even ordinary starch syrups having mean polymerization degrees of only 2. They lack the sweetness of starch syrups and are little reducible. There is no precedent of the manufacture of such dextrins of constant composition. For these reasons, the present invention should be regarded as an important one for the starch industry. The above-mentioned physical properties of the amyloses according to the present invention may be taken advantage of in the preparation of water-soluble, edible films, membranes, fibers and foams. If their chemical structures are utilized, it would be feasible to produce syrups entirely from amylose through decomposition with an enzyme or acid. Further, the absence of α-1,6- bonds facilitates the decomposition by glucoamylase or β-amylase, thus rendering it possible to increase the respective decomposition rates extremely.

The present invention has so far been described primarily in connection with the enzyme from the genus pseudomonas. In the case of the enzyme from aerobacter bacteria, the enzymatic activity apparently differs somewhat. The product shows relatively high solubility and is difficult to fractionate as a crystalline precipitate. Precipitation with butanol or concentration of the whole mass is required for the purpose of fractionation. Further details will be discussed in the examples to be given later.

As for other amylose-containing starches than waxy corn starch, e.g., potato starch, the amylose contents obviously cause a wide-spread distribution of the polymerization degrees of the amylose molecules, and the mean polymerization degree of those molecules are accordingly increased.

Lastly, concerning the concentration of the reaction solution, it ranges from 5 to 10%. With a concentration of 20%, the reaction velocity appears to be retarded. This is attributed to the fact that the dispersion of the starch slurry is effected at 100° to 130° C. By heating with agitation at a temperature below the decomposition temperature of dextrose in the range of 150° down to 100° C., it is possible to obtain more than 25% gelatinized solution. This solution is highly viscous and tends to retrograde upon the drop of the temperature. Therefore, it is sprayed into a vacuum cooler and is thereby cooled rapidly. At the same time, a predetermined amount of the enzyme is sprayed into the same cooler and is thoroughly mixed with the sprayed solution to drop the temperature rapidly and promote the decomposition so as to decrease the viscosity. Alternatively, the enzyme may be poured into a large amount of the solution in the fairly advanced stage of decomposition and dilute the solution with stirring to decrease the viscosity and facilitate the reaction. In either way, the concentration of the reaction solution can be increased. The process of the present invention and the behaviors of the products will now be illustrated in the examples below.

EXAMPLE 1

Decomposition of various starches with α-1,6-glucosidases

Waxy corn starch, glutinous rice starch, and potato starch are purified and are suspended in water to prepare 5 to 10% aqueous suspensions. The suspensions are adjusted to pH 4.0 to 5.0 when an enzyme produced by bacteria of the genus Pseudomonas is used or to pH 5.8 to 6.0 when an enzyme from bacteria of the genus Aerobacter (Pat. No. 3,622,460). They are heated with stirring to gelatinize the starch.

For complete gelatinization, each gelatinized solution is further heated at a pressure of 1.5 to 2.0 kg./cm.$^2$ for 20 to 30 minutes, and then is rapidly cooled to 45° C. The enzyme is added in an amount of 20 to 100 units per gram of the starch, and the mixture is reacted with stirring at 45° C. After the lapse of about 16 hours, the reaction rapidly takes place. The progress of the reaction is determined as the solution turns blue upon the addition of an iodine-potassium iodide solution which initiates a reaction characteristics of the particular amylose produced.

In about one hour after the reaction the viscosity is remarkably decreased. When the Pseudomonas enzyme is used, the precipitation of amylose occurs with the progress of the reaction.

The rate at which the reaction proceeds is determined by adding 9 ml. of N/10 hydrochloric acid per milliliter of the reaction solution thereby terminating the reaction and testing the solution by the anthrone method. As amount of the solution equivalent to 10 mg. of sugar is sampled, and with the addition of 2 ml. of an acetic acid buffer solution at pH 4.0 and 0.5 ml. of a 0.3% aqueous solution of iodine and potassium iodide, the total amount is increased to 100 ml. After 30 minutes the extinction coefficient as measured with light of wavelength of 570 mμ is recorded.

Thus, when the reaction reaches a point as determined by the iodide color test, the solution is concentrated by boiling, and is then powdered. When the Pseudomonas enzyme is used, the amylose produced precipitates. Therefore, the solution is concentrated to a concentration of about 20% solids, cooled, and the precipitate is allowed to deposit overnight, and is then separated by centrifuging. Next, the precipitate is dissolved to 20% solids, re-precipitated, and the new precipitate is separated and dried at 40° to 50° C.

The supernatants obtained by said centrifuging of reaction mixture are mixed and concentrated in vacuo, and is finally dried and powdered.

The treatment for precipitation and separation as above described is rendered easiest, when the Pseudomonas enzyme is used, by the adoption of waxy corn starch or glutinous rice starch as the starch material.

EXAMPLE 2

When 30% waxy corn starch is continuously fed in a multi-blade agitation column and is heated with live steam to 160° to 165° C., a transparent and viscid gelatinized solution results with a decomposition degree of less than 1% D.E. It is sprayed into a vacuum cooler. Also a predetermined amount of a Pseudomonas or Aerobacter enzyme solution is sprayed. Both solutions in misty form are mixed up completely and instantaneously, and the mixture is immediately poured into a large amount of the reaction solution in a reaction tank, with stirring. The average retention time in the tank is preferably about one hour.

Next, the reactants are continuously transferred into a main reaction tank, and the reaction is carried out in batch operation for 20 to 40 hours. In 1 to 2 hours, the reaction proceeds with a decline in the viscosity. From then on the same conditions as described in the preceding Example 1 prevail. Since the solution is highly concentrated, it favorably precipitates.

EXAMPLE 3

After various starches have been purified, the starch solutions are adjusted to concentrations of 30 to 35% and to pH 6. Next, α-amylase (liquefying enzyme) is added to each solution in an amount of 5 units per gram of the starch. Then, in the same manner as described in Example 2, the mixture is forced into a continuous liquefying equipment, e.g., the equipment of Japanese Pat. No. 426,978, and the temperature is adjusted to 100° C. After a retention time of 5 to 7 minutes, a viscous liquefied starch solution with a low degree of decomposition is obtained. It is a transparent, homogeneously gelatinized starch solution with a decomposition degree of 1 to 0.5% D.E. This solution is rapidly cooled as in Example 2, and is decomposed in the same manner with the addition of an $\alpha$-1,6-glucosidase. The viscosity of the resulting solution is slightly less than the solutions obtained at higher temperatures of over 150° C., thus obviously rendering the treatment easy. No appreciable difference is observed in the decomposition product, however.

Summary of experimental results (1) *Concentration of gelatinized solution.*—In Example 1 the concentrations in the range of 5 to 10% were compared by color development in the iodide reaction. The results showed that the same effect is attained with concentrations up to 10%, but at more than 20% the reaction is prolonged undesirably. In Example 2, the solutions charged had concentrations ranging from 5 to 30%, and a comparison gave results similar to those in the preceding example with concentrations up to 20%.

(2) *Amount of enzyme to be used.*—When a reaction is carried out for 48 hours, the minimum amount of enzyme is 20 units per gram of the starch. Enzyme used in an amount of 5 to 10 units per gram of the starch requires much extended time and causes no amylolysis at all.

(3) *Mean polymerization degree and branching degree of the product.*—For the determination of the mean polymerization degree, the procedure of Methods in Carbohydrate Chemistry, vol. V 251 (65) "Determination of reducing end-groups by periodate oxidation" was adopted. As for the determination of the number of branches, reference was had to the so-called Smith decomposition method proposed by T. K. Hamilton and F. Smith in the Journal of Americal Chemical Society, 78 65907 (1956), ibid., 78, 5910 (1956).

| Starch | Mash conc. | Enzyme | In liquid, precipitated | D.P. | Mean No. of branch |
|---|---|---|---|---|---|
| W | 1% (I) | SE 1,000 | | 22.95 | 1.49 |
| P | 1% (I) | SE 1,000 | In liquid | 21.34 | 2.71 |
| | | | BuOH Precipitated | 61.87 | 0.99 |
| W | 5% (I) | SE 100 | In liquid | 22.42 | 1.39 |
| | | | Precipitated | 34.72 | 1.50 |
| W | 5% (I) | SE 20 | In liquid | 30.01 | 2.17 |
| | | | Precipitated | 30.84 | 2.33 |
| W | 10% | SE 50 | In liquid | 19.0 | |
| | | | Precipitated | 32.2 | |
| W | 20% (II) | SE 50 | In liquid | 20.1 | |
| | | | Precipitated | 34.0 | |
| | 25% | SE 50 | In liquid | 20 | |
| | | | Precipitated | 36 | |

NOTE.—W=Waxy corn starch; P=Potato starch; $SE_{100}$=Pseudomonas enzyme; (I), (II)=Treated in accordance with Example 1 or 2, respectively; 1,000=1,000 units of enzyme used per gram of the starch.

Polymerization degrees attained by repeated reactions with same enzyme

| | Conc., percent | Enzyme | Soluble portion | | Precipitated portion | |
|---|---|---|---|---|---|---|
| | | | D.P. | No. of branch | D.P. | No. of branch |
| 1st reaction | 5 | SE 50 | 19.86 | 3.4 | 32.53 | 3.1 |
| 2d reaction | 1 | SE 50 | 17.67 | 2.3 | 23.43 | 2.3 |
| 3d reaction | 1 | SE 50 | 17.27 | 2.2 | 23.19 | 2.3 |

From the foregoing results, it is appreciated that in the case when an enzyme is used in large excess or repeatedly for the reaction purpose, waxy corn starch shows polymerization degrees of 17 (in the soluble portion) and 23 (in the precipitated portion). When potato starch is employed, the original amylose content increases the polymerization degree of the precipitated portion but the product will attain practically no branch. In other occasions, too, the branching is extremely little, apparently leaving only a branch or two in the molecular structure.

(4) Some typical yields of products:

| Material | Conc., percent | Enzyme | Reac. time | Soluble portion | Precipitated portion | Total yield/material |
|---|---|---|---|---|---|---|
| W | 5 | SE 100 | 48 | 9.4(19.6) | 90.6(27.68) | 77.1 |
| W | 10 | SE 50 | 48 | 19.6(20.1) | 80.4(34.3) | 92.8 |
| W | 10 | SE 50 | 48 | 21.8(19.9) | 78.2(34.5) | 96.8 |
| W | 10 | SE 50 | 48 | 14.1(19.8) | 85.9(32.2) | 81.1 |
| W | 5 | SE 50 | 48 | 31.2(20.8) | 68.8(25.8) | 99.3 |

NOTE.—Values in parentheses represent mean polymerization degrees.

Hence,

| | Precipitated | Supernatant | Branch degree |
|---|---|---|---|
| When SE 100 is used; | | | |
| Polym. deg. | 20~28 | 20 | |
| Yield | 90 : | 10 | 2~3 |
| When SE 50 is used; | | | |
| Polym. deg. | 30~34 | 20 | |
| Yield | 80 : | 20 | 2~3 |
| When SE 100 (1,000) is used; | | | |
| Polym. deg. | 24~23 | 20~18 | 1~0 |
| Yield | 90 : | 10 | |

(5) Yields and polymerization degrees of products from various starches:

AE 50  W 5%:

| | Yield BuOH, percent | | Mean polym. deg. | |
|---|---|---|---|---|
| Material starch | Soluble portion | Precipitated portion | Soluble portion | Precipitated portion |
| Tapioca | 70.3 | 29.7 | 24.01 | 88.43 |
| Corn | 51.9 | 48.1 | 24.12 | 68.41 |
| Wheat | 42.5 | 57.5 | 22.60 | 78.39 |
| Sweet potato | 59.6 | 40.4 | 25.96 | 63.79 |
| Sago | 60.9 | 39.1 | 23.76 | 59.86 |

AE 50  W 10% charged:

| Tapioca | 60.8 | 39.2 | 24.11 | 49.58 |
|---|---|---|---|---|
| Corn | 52.8 | 47.2 | 16.63 | 58.34 |
| Wheat | 49.0 | 51.0 | 20.94 | 82.72 |
| Sweet potato | 58.6 | 41.4 | 26.34 | 75.79 |
| Sago | 51.1 | 48.9 | 17.38 | 51.93 |

NOTE.—Enzyme of AE=Aerobacter.

The soluble portions of decomposed products of various starches are understood to represent small amylose molecules, with polymerization degrees of 17 to 20. The precipitated portions (in 10% butanol) have higher molecular weights presumably due to the original amylose contents, though apparently with some irregularity in the molecular weight.

(6) *Solubility of the products.*—Each test specimen is dissolved in water at a predetermined temperature, kept at a constant temperature overnight to cause precipitation. The amount of sugar in the supernatant fluid is determined by the anthrone method as a measure of the solubility.

The results of the tests were as tabulated below. The solubility was determined of the soluble and precipitated portions of many different surface and underground starches using from 150 to 1000 units of various enzymes of the Pseudomonas and Aerobacter origins per gram of each starch. The values given in FIGS. 3 and 4 are mostly regarded as functions of the polymerization degrees.

(7) *Specific rotations.*—Two grams of each test specimen was dissolved in 100 ml. of 30% $CaCl_2$ aq. and the specific rotation was determined. The results are as tabled below:

| Starch | Enzyme | Polym. deg. | $(\alpha)^{22}_D$ |
|---|---|---|---|
| W | SE 50 precipitated | 32 | +194.90 |
| W | SE 50 soluble | 20 | +188.90 |
| W | {SE 50 precipitated / Re SE 50 precipitated} | 23 | +193.00 |
| W | {SE 50 soluble / Re SE 50 soluble} | | +175.29 |
| W | SE 1,000 | 23.0 | +176.0 |
| P | AE 100 BuOH soluble | 24.5 | +163.25 |
| P | AE 1,000 soluble | 21.3 | +150.45 |
| W | SE 150 soluble | 20.8 | +163.77 |
| W | SE 150 precipitated | 25.8 | +182.71 |

NOTE.—Re: Same enzyme used again for the reaction of the same specimen.

(8) Viscosity.—Using a B type rotary viscometer at 60 r.p.m., with BL adapter, the viscosity of the products was evaluated. They gave relatively low viscosity values. The results were as tabled below:

| Test specimen | Mean polym. deg. | Conc., percent | Centipoises at 60° C. | 50° C. | 40° C. |
|---|---|---|---|---|---|
| | | 15 | 1.37 | 1.50 | 1.89 |
| W SE 150 soluble | 20.78 | 15 | 1.37 | 1.50 | 1.89 |
| | | 10 | 0.97 | 1.29 | 1.40 |
| | | 5 | 0.89 | 0.97 | 1.14 |
| W SE 150 precipitated | 25.79 | 15 | 6.19 | 6.32 | 6.46 |
| | | 10 | 4.32 | 4.50 | 4.85 |
| | | 5 | 1.23 | 1.58 | 2.10 |
| P AE 1,000 soluble | 24.53 | 15 | | 2.03 | 2.25 |
| | | 10 | | 1.42 | 1.84 |
| | | 5 | | 1.13 | 1.15 |
| W AE 1,000 soluble | 23.05 | 15 | | 3.01 | 3.96 |
| | | 10 | | 1.82 | 2.40 |
| | | 5 | | 1.15 | 1.48 |
| P SE 1,000 BuOH soluble | 21.34 | 15 | | 1.61 | 2.10 |
| | | 10 | | 1.20 | 1.75 |
| | | 5 | | 1.00 | 1.12 |
| 43° DE syrup | | | 0.94 | | |
| Water | | | 0.90 | | |

(9) Other impure contents:

| | Percent Crude proteins | Ash content |
|---|---|---|
| W SE 50, soluble | 4.04 | 0.072 |
| W SE 50, precipitated | 0.205 | 0.052 |

(10) Moisture absorption.—When determined at R.H. 80% and 30° C., the soluble and precipitated portions showed considerable differences in the moisture absorption. These differences are reflected to some extent in the solubility. The precipitated portions which have some degrees of crystallinity appear to have water contents close to those levels of the starches. FIG. 5).

What is claimed is:

1. A process for preparing now molecular weight amylose comprising: heating a starch slurry to about 160° C. until a gelatinized starch with a D.E. of about 1 is obtained; quickly cooling said gelatinized starch directly to temperatures of between about 45 to 50° C.; adding an α-1,6-glucosidase from the species *Pseudomonas amyloderamosa* ATCC 21262 to the cooled gelatinized starch; and allowing the α-1,6-glucosidase and the starch to react for a sufficient time to debranch practically all of the α-1,6-bonds of amylopectin.

2. A process for preparing low molecular weight amylose as defined in claim 1 in which the gelatinized starch slurry is sprayed into a vacuum cooler thereby to cool it quickly.

3. A process for preparing low molecular weight amylose comprising: decomposing a starch slurry with α-amylase to about D.E. 1; quickly cooling the decomposed starch solution to temperatures of between about 45 to 50° C.; adding an α-1,6-glucosidase from the species *Pseudomonas amyloderamosa* ATCC 21262 to said cooled starch solution; and allowing the α-1,6-glucosidase and the starch to react for a sufficient time to debranch practically all of the α-1,6-bonds of amylopectin.

4. A process for preparing low molecular weight amyloses as defined in claim 3 in which the liquefied starch slurry is sprayed into a vacuum cooler thereby to cool it rapidly.

References Cited
UNITED STATES PATENTS

| 3,560,345 | 2/1971 | Yokobayashi et al. | 195—31 R |
| 3,556,942 | 1/1971 | Hathaway | 195—31 |
| 3,532,602 | 10/1970 | Seidman | 195—31 |

OTHER REFERENCES

Nierle, W. "Enzymic Liquefaction of Starch," Chem. Abs., vol. 68, No. 70376e, 1968.

A. LOUIS MONACELL, Primary Examiner

G. M. NATH, Assistant Examiner